Jan. 27, 1953  W. C. EAVES  2,627,011
HEATING DEVICE FOR WINDOW CLEANERS
Filed April 5, 1949  2 SHEETS—SHEET 2
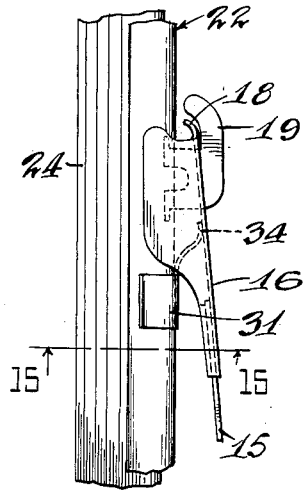
FIG-12-
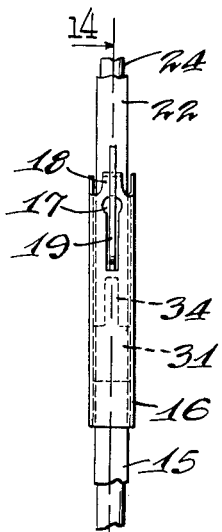
FIG-13-
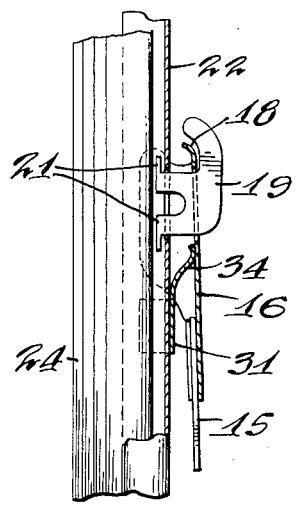
FIG-14-
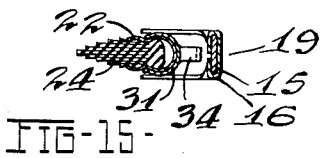
FIG-15-
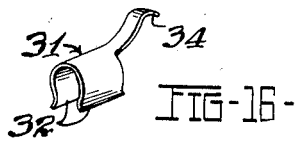
FIG-16-
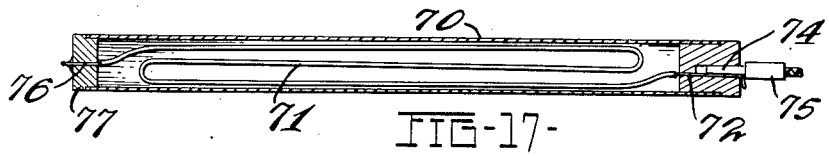
FIG-17-
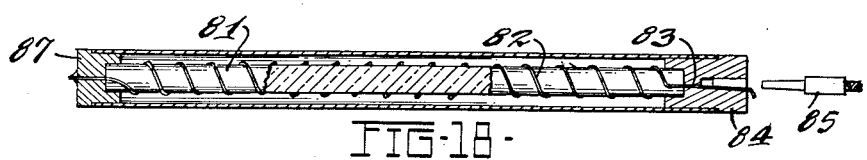
FIG-18-
FIG-19-
INVENTOR.
WILLIAM C. EAVES
BY
Harry O. Ernsberger
ATTY.

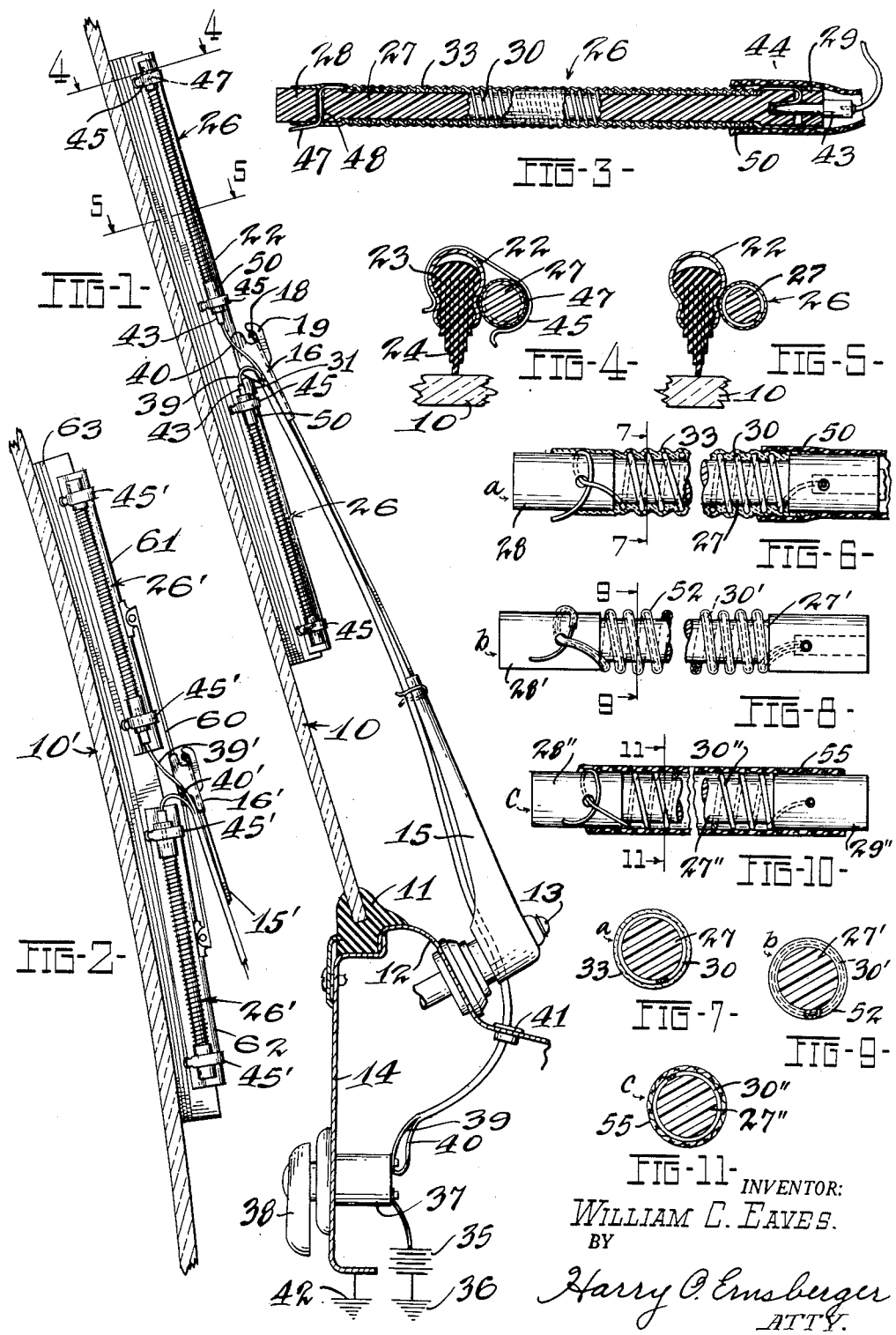

Patented Jan. 27, 1953

2,627,011

UNITED STATES PATENT OFFICE 2,627,011

HEATING DEVICE FOR WINDOW CLEANERS

William C. Eaves, Elyria, Ohio

Application April 5, 1949, Serial No. 85,563

5 Claims. (Cl. 219—19)

This invention relates to devices or heating units for use in conjunction with windshield or window wipers or squeegees to facilitate the removal or dissipation of ice or sleet which may collect on the windshield and windshield wiper construction.

One of the major problems which makes winter operation of automotive vehicles hazardous is the accumulation of snow, ice or sleet on a vehicle windshield and windshield cleaner or wiper mechanism. Several means or devices have heretofore been made for the purpose of melting or removing ice and snow through the use of an electrically energized heating means but these attempts at solving the problem have been unsatisfactory. Prior devices have been tried wherein a substantial area of the windshield is provided with a web of resistance wire adapted to be heated upon passage of an electric current therethrough but such devices have disadvantages of impairing the vision of the vehicle operator by reason of the presence of the strands of resistance wire and the heating of such an element is insufficient to effect satisfactory removal of ice and snow. Other devices have been constructed which incorporate electrically energized resistance units operated in conjunction with a windshield wiper on the principle of effecting a transfer of heat from the wiper blade to the windshield but these have proven failures for various reasons including lack of sufficient heat, its ineffective transfer to a metal part of the wiper assembly and because of insufficient area of surface radiation. It is known that as long as the rubber wiper blade remains soft and flexible so that it will effectively maintain full engagement or area contact with the surface of the window or windshield throughout traverse of the wiper, ice seldom forms except under severe icing conditions. However when a small particle of ice forms on the windshield or ice collects on the wiper blade so as to impair its normal flexibility, full engagement or contact of the wiper with the windshield becomes impossible. The existence of these conditions results in the wiper traversing an undulating course over the windshield surface, the ice particles moving the wiper out of contact with the windshield during each successive movement of the wiper. This action rapidly enhances the further growth of ice particles on the windshield surface with each passage of the wiper blade thus quickly resulting in the formation of a full sheet of ice. I have found that ice formation or its accumulation may be prevented and collected ice effectively removed by maintaining the wiper blade in soft, pliable condition through the presence of water on the blade so as to maintain smooth contact thereof with the windshield throughout the area traversed thereby.

The present invention embraces the provision of electrically energized means associated with a windshield cleaner or wiper in a manner for effectively melting ice, snow or sleet from the wiper assembly and windshield with which the device may be used and preventing the formation of ice on the wiper assembly and windshield.

The invention embraces the provision of an electrically energized heating fixture or unit for use with a windshield or window wiper wherein ample heat radiating surface is provided for efficiently and effectively melting ice or sleet which may have collected upon the windshield wiper or for preventing the initial formation of ice upon the wiper, the unit being arranged whereby the resulting water from the melting ice flows over ice collecting on the windshield or window to melt or soften the ice so that the moving wiper will effectively remove the water and the ice which may be loosened by the water.

The invention further comprehends the provision of an effective electrically energized heating unit which may be inexpensively manufactured and quickly attached to a windshield wiper or squeegee frame of conventional construction, coupled with an electric circuit for energizing the heating unit to loosen or melt ice collecting on the wiper device.

Another object resides in the provision of electric heating units especially adapted and arranged for installation with windshield wiper mechanism or squeegee devices arranged for traversing and cleaning curved windows or windshields.

Another object of the invention resides in the provision of an electrically energizable heating unit in which the heating element has a comparatively large heating radiating surface disposed with respect to a wiper frame so as to effectively melt collected ice, the heating element being insulated from the wiper frame by an insulating medium arranged that it does not materially affect the rapid transfer of heat from the coil to the wiper frame or support.

Another object is the provision of an arrangement of this character wherein a comparatively large area of surface radiation is provided to enhance the effective and rapid transfer of heat to the windshield wiper assembly.

Another object is the provision of a de-icing means for a windshield wiper assembly wherein two or more spaced heating units are mounted upon a wiper blade frame in a manner whereby heat is effectively transferred to the frame without impairing the effectiveness or operation of the articulate connection between the blade frame and its supporting or actuating means.

Still another object is the provision of a current conducting element or bridge for effectively establishing a circuit from the wiper frame to its supporting and actuating means without interference with or impairment of the operation of the articulate connection between the wiper frame and said means.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of forms of the invention, which may be preferred, in which:

Figure 1 is a vertical sectional view through a vehicle windshield and mounting illustrating a windshield wiper mechanism and heating units of my invention associated therewith;

Figure 2 is a sectional view through a curved windshield showing the heater units of my invention incorporated with another form of windshield wiper construction;

Figure 3 is a longitudinal sectional view showing a form of heating unit of my invention;

Figure 4 is an enlarged detail sectional view taken substantially on line 4—4 of Figure 1;

Figure 5 is a sectional view taken substantially on line 5—5 of Figure 1;

Figure 6 is an enlarged detail elevational view partly in section showing the form of heating unit of Figure 3;

Figure 7 is a detail sectional view taken substantially on the line 7—7 of Figure 6;

Figure 8 is a view similar to Figure 6 showing another form of heating unit;

Figure 9 is a sectional view taken substantially on the line 9—9 of Figure 8;

Figure 10 is a view similar to Figure 6 showing still another form of heating unit, and Figure 11 is a sectional view taken substantially on the line 11—11 of Figure 10.

Figure 12 is an enlarged fragmentary elevational view of the articulated connection between the wiper blade frame and its actuating arm showing the ground clip or bridge forming a part of the invention;

Figure 13 is a top plan view of the structure shown in Figure 12;

Figure 14 is a sectional view taken substantially on the line 14—14 of Figure 13;

Figure 15 is a transverse sectional view taken substantially on the line 15—15 of Figure 12;

Figure 16 is an isometric view of the ground clip per se;

Figure 17 is a longitudinal sectional view showing a modified form of heating unit;

Figure 18 is a longitudinal sectional view illustrating another form of heating unit, and Figure 19 is an elevational view of one of the elements shown in Figure 18.

While I have illustrated the forms of heating unit of my invention as mounted upon the movable wiper or cleaning element for a windshield of an automotive vehicle, it is to be understood that I contemplate the utilization of my invention with any arrangement for the purpose of melting ice, snow or sleet from various forms of glazing such as the windows of railway cars, aircraft, water craft, etc.

Referring to the drawings in detail and first with respect to Figure 1 there is illustrated a vehicle windshield 10 suitably mounted or supported in a flexible rubber grommet or member 11 supported upon a cowl portion 12 of the vehicle body, the latter being provided with an instrument panel 14. Mounted on and extending through the cowl portion 12 is an operating shaft 13 which is oscillated by suitable means (not shown). Mounted upon the shaft 13 is an arm 15 which carries a windshield wiper or cleaner construction at its extremity. As illustrated in Figures 1, 2, 12, 13, 14 and 15, the end of the arm 15 is secured to a member 16 which is provided with a slot 17 and a bridge 18 adapted for interlocking engagement with a clip or bracket 19 loosely secured to the center portion of a windshield wiper frame or bar 22 by means of projections 21 extending interiorly of the bar 22. This arrangement provides an articulate connection between the arm 15 and wiper whereby the latter is adapted for limited universal movement with respect to the arm so that the wiper may remain in full engagement with the surface of the windshield during its movement thereover. The windshield wiper bar 22 is formed of sheet metal to a U-shaped hollow configuration as shown in Figures 4, 5 and 15 and disposed in the hollow interior thereof is a windshield cleaner or wiper element 23 of flexible rubber having comparatively thin flexible vane-like portions or blades 24 extending beyond the bar 22 for engagement with the surface of the windshield, window or other surface adapted to be cleaned by movement or traverse of the wiper element thereover.

The forms of the invention include the provision of electrically energized heating elements or units fashioned in a manner and form to provide a comparatively large surface area to facilitate the efficient radiation or transfer of heat to the metallic frame member 22 of the wiper mechanism for the purpose of quickly and effectively melting ice or snow collecting on the windshield wiper frame 22 and the blade 24. I have found that by adequately heating the metal member 22, which being formed of sheet steel or the like is a good conductor of heat, that collected ice will be melted or the formation of ice prevented under freezing conditions. As the water formed by the melting ice is above freezing temperature, it will flow along the wiper blade 24 and over the area of the windshield 10 traversed or swept by the wiper blade 24, the water thus providing the medium for melting ice and snow on the windshield area.

Figures 1 and 3 through 7 inclusive illustrate one form of my invention which includes heating units 26, each formed with an elongated round core 27 of suitable insulating material as for example fiber, Bakelite, porcelain or other suitable non-conductor of electricity which is rigid yet non-brittle in character so that it is not easily broken. As shown in Figures 3 and 6 the central portion of the core 27 is of slightly lesser diameter than the ends 28 and 29 forming a recess adapted to receive an electrically energizable heating element 30 in the form of a coil or spirally wound configuration in which the convolutions are slightly spaced longitudinally so as to obtain a maximum number of turns or coils in a given space without shorting or engagement of adjacent convolutions. I have found that a heating coil fashioned from resistance wire of approximately twelve-thousandths of an inch in diameter supplied with current from a six volt storage battery or accumulator functions satisfactorily when used with a conventional windshield wiper assembly. While there are various alloys that may be employed as electrical resistance units, a Nichrome wire consisting substantially of 16% chromium, 60% nickel and 24% iron has been found to be satisfactory. I preferably utilize two heating units for installation on a single wiper blade frame and each heating element or unit contains a length of about forty-five inches of the Nichrome resistance wire. It is to be understood that the length of the core 27 and the amount of resistance wire in the heating element may be varied depending upon the size of windshield wiper or installation with which the heating unit is incorporated. Further the amount of heat desired for various installations may be obtained by employing resistance wires of different diameters and lengths in the heating units. I have found that by making the diameter of the core 27 at its central portion of about $\frac{3}{32}$ of an inch that the unit occupies but a small space and does not interfere in any manner with the cleaning operations or movements of the wiper blade. In the form of heater unit shown in Figures 3 through 7 inclusive, bare Nichrome wire may be used and a coating or layer of insulating material 33 applied after the wire is wound upon the core 27. Any suitable material which will withstand a temperature of approximately 300° Fahrenheit will provide a suitable insulating means. The insulating material may be applied as by spraying the same upon the core and wire, or the unit may be immersed in a solution of insulating material and subsequently air dried or baked on the heating unit. I have found that the following materials provide satisfactory insulating means, phenolformaldehyde, baked enamel, Japan finish or plastic cement. Any suitable thermo-settable resin having non-current conducting characteristics may be employed as an insulating coating 33. It is desirable that the coating be relatively thin so as to permit the wire 30 to be as close as possible to the windshield wiper frame 22 in order to obtain the highest efficiency of heat transfer from the resistance wire to the windshield wiper frame 22, the coating being only of sufficient thickness to prevent direct metal-to-metal contact to prevent "shorting" of the turns of wire. While I have found that the insulation on the wire need not actually contact the surface of the wiper frame 22 to secure satisfactory transfer of heat to the frame, it is desirable to mount the unit as close to the bar as practicable in order to attain a high efficiency of heat radiation or transfer to the wiper frame.

A typical circuit for the windshield wiper heater unit assembly is illustrated in Figure 1 wherein a storage battery 35 illustrated diagrammatically is suitably grounded as at 36 to the frame or other portion of the vehicle in a conventional manner. The battery 35 is connected to a suitable circuit controlling switch 37 mounted upon the instrument panel 14 and operated by a suitable manipulating button or knob 38. Current conducting means in the form of wires 39 and 40 connected to a switch terminal 37, the wires passing through a grommet 41 in the vehicle cowl 12 and extending coextensive with the arm 18 to the point of juncture of the arm with the wiper frame 22. If desired a single wire may be used connected to the switch and leading to the point adjacent the member 16 where it may be divided for connection to both heating units. Soldered or otherwise secured to the end of each of the conductors is a cylindrical metal tip 43 which snugly projects into or fits in a suitable opening formed in the end of the core 27. As particularly shown in Figure 3, one end of the resistance wire 30 extends through an opening in the enlarged end 29 of core 27, the end portion 44 of the resistance wire lying coextensive with the tip 43 to establish engagement or connection between the tip 43 and the resistance wire. Each of the heating units is preferably supported upon the wiper frame 22 by means of resilient or spring clips 45 which are generally of U-shaped configuration and which are shaped to embrace the wiper frame 22 and the heating unit in the manner illustrated in Figure 4. A clip 45 is arranged adjacent each end of the core of the heating unit and adapted to embrace the enlarged portions 28 and 29 thereof. The other end 47 of the resistance coil 30 of each unit extends through an opening 48 in the enlarged portion 28 of the core and is arranged to be directly engaged by the clip 45 at the outer end of the heating unit as shown in Figure 1, this clip forming a connection to complete the return circuit through the metal bar 22. As the bar 22, arm 15 and associated mechanism are formed of metal, these metal parts are utilized to form the return or ground circuit to the frame of the vehicle. I have found that the articulate connections between the wiper frame 22 and clip 19, and between the latter and the member 16 carried by arm 15 of the conventional windshield wiper assembly, do not form reliable electrical circuit connections for the reason that the articulate relative movements of these elements do not always provide a complete metallic path for current flow. Furthermore the articulations cause momentary interruptions of current flow setting up "arcing" resulting in oxidation of the normally interengaging surfaces thus further impairing the circuit or rendering the same ineffective to energize the heater. The present invention includes a means for bridging or by-passing the articulate connections of the wiper assembly to secure a positive and continuously effective electrical circuit for the heater. As illustrated in detail in Figures 12, 14, 15 and 16, there is provided a current conducting member or bridge 31 in the form of a U-shaped resilient clip, the legs or furcations 32 thereof engaging the exterior surface of the frame 22, the clip being integrally formed with an extension or tongue 34 in contact with the member 16. The engagement of the extension 34 with member 16 is effective at all times to establish an electrical connection or path for flow of current from the frame 22 to member 16 and arm 15 irrespective of the articulate movements of frame 22 and clip 19 relative to the member 16.

When the operator of the vehicle desires to place the heating unit in operation, the switch knob 38 is moved to circuit closing position to complete the circuit from battery 35 through switch 37, conductors 39 and 40, tips 43 and through each of the heating units or resistance elements 30 through the outer clips 45 and bar 22 through the current conducting bridge 31 to the ground connection 42 as illustrated in Figure 1.

Means are provided for insulating the inner ends or terminals 44 of the heating units or coils from the bar 22. As shown in Figures 1, 3 and 6, a sleeve 50 of fiber or fabric impregnated with a suitable insulating material is slipped over the end 29 of the core 27 to prevent metallic contact of the terminal wire 44 with the innermost clips 45 so as to prevent grounding or shorting the heating units to the bar 22 at this point.

As particularly shown in Figures 4 and 5 the wire or heating element 30 is closely disposed to or lies adjacent the metal wiper frame 22, the same being separated from the bar merely by the thin coating of insulation 33 so that a large area of the heating coil 30 is rendered effective to transfer heat to the bar 22 for the purpose of quickly melting ice or snow collecting on the bar 22. While I have illustrated an arrangement wherein two heating units are carried by the bar 22 so that the connections between the member 19 and the wiper frame 22 do not interfere with the positioning of the units in intimate contact with the bar 22, it is to be understood that one heating unit per se may be used without departing from the spirit of the invention. Moreover the particular shape of heater units described and the method of supporting same facilitates the use of the units with windshield wiper assemblies of various lengths thus minimizing the number of sizes required for various installations.

Another form of heating element or unit is illustrated in Figures 8 and 9 wherein the wire of the resistance coil 30' is suitably encased or insulated by a wrapping 52 which may be formed of heat resisting fiber, fiber glass or other suitable material, the insulated wire being wound upon the core 27' in the same manner as in the previously described form of the invention. In this type of heating unit a separate insulating coating is not required. It is desirable that the insulation 52 on the resistance wire is made very thin in order to permit the wire to be disposed as close as possible to the wiper frame 22 without grounding. The circuit for the heating unit shown in Figures 8 and 9 is the same as that described in connection with the heating unit shown in Figures 1 and 3 through 7 inclusive.

Figures 10 and 11 illustrate another modification of the heating unit of my invention wherein the core 27'' is surrounded by a coil 30'' of bare resistance wire over which a thin sleeve 55 of fiber or other tubular form of insulating material is slidably received over the core. The sleeve 55 is formed with a very thin wall so as to provide a minimum space between the wire of the coil 30'' and the windshield wiper frame bar 22.

The arrangement shown in Figure 2 illustrates an embodiment of the heating units of my invention with a windshield wiper arrangement especially adapted for use with a curved windshield or surface 10'. In this form of windshield wiper construction the arm 15' is connected to the center portion of a supplemental bar 60, to the ends of which are articulately connected the metal windshield wiper frame bars 61 and 62, each of which is similar in construction to the bar 22 hereinbefore described. A flexible cleaning member or squeegee 63 of rubber or other suitable material is supported by both bars 61 and 62. The wiper element or squeegee 63 being formed of flexible rubber and when supported upon the bars 61 and 62 mounted for independent articulation with respect to the bar 60, the wiper element 63 readily and flexibly engages a curved surface and will effectively follow the curvature of the glass or other surface to be cleaned. In this form of construction an individual heating unit 26' is carried by each of the bars 61 and 62 through metal or spring clips 45' in the same manner that the clips 45 secure the heating units to the bar 22 as shown with the windshield wiper construction disclosed in Figure 1. A ground clip or bridge 31' is employed between the member 16 and the bar 60 to insure electrical connection between these elements. The conductors 39' and 40' for energizing the heating units in the form of the invention shown in Figure 2 are connected to a switch and battery or source of current supply in the same manner as illustrated in Figure 1.

Figure 17 illustrates another form of heating unit of my invention which includes a thin-walled tube 70 of metal which encloses a length of insulated resistance wire 71 forming the heating element. One end 72 of the wire passes through an opening in a member 73 of insulating material mounted in one end of the tube and is adapted to be engaged by a metal tip 74 of a current conductor 75 corresponding to the current conductor 39 in the form of the invention illustrated in Figure 1. The other end 76 is connected to a metal member 77 mounted at the other end of the tube 70. The unit shown in Figure 17 is mounted on a windshield wiper assembly in the same manner as the other forms of the invention herein disclosed. In this type of heater, the heat generated by current flow through the resistance unit or wire 71 radiates to the tube 70, and the latter being in juxtaposition with the metal frame of the wiper unit, heat is thus effectively transferred to the frame. The tube 70 may if desired be made of fiber or other material which will withstand the heat generated by the resistance unit 71. If a non-metallic tube is used, the terminal 76 of the resistance unit is secured to the wiper frame by means of a clip 45 as shown in the arrangement of the unit in Figure 1. The insulation on the resistance wire prevents short circuits between adjacent laps of the resistance wire or between the wire and the metal tube 70.

Figures 18 and 19 illustrate another form of heating unit wherein the resistance unit is of cartridge form to particularly facilitate installation and replacement. In this form a metal tube 80 similar to the tube 70 encloses a resistance unit comprising a rigid core 81 of fiber, porcelain or other insulating material upon which is supported a coil of resistance wire. The core and coil are illustrated in Figure 19. One terminal 83 passes through an opening in a member 84 of insulating material carried at one end of the tube 80, member 84 being bored to receive a current conductor tip or connection 85. The other terminal 86 may be soldered or otherwise secured to a metallic member 87 disposed at the other end of the tube 80. This type of unit is mounted on a wiper frame in the same manner as the other forms of heating unit of the invention. The core 81 is preferably supported by the member 84 and plug 87 by extending into suitable recesses formed therein as shown in Figure 18. Through this method of supporting the core, the wire 82 is maintained in spaced relation from the inner wall of the tube 80. The heat generated by the current flowing through the wire 81 is radiated to the tube 80 thence to the wiper frame upon which it is mounted.

It is to be understood that heating units may be made of different sizes and of different sized resistance wire depending upon the particular installation. For example, in wiper installations for use on aircraft, boats and certain trucks, a higher voltage battery may be employed and hence a larger diameter resistance wire may be utilized to secure the requisite amount of heat for melting ice collecting on the windshield wiper frame. The specific wire size hereinbefore mentioned in connection with the forms of the invention described herein is merely illustrative of the size that has given satisfactory results when used with the conventional type of vehicle windshield wiper. In the forms of my invention I have found that sufficient heat is transmitted from the energized resistance wire to the wiper bar so as to de-ice the wiper construction, the water therefrom de-icing the surface over which it traverses, and is effective at temperatures as low as 20° below zero Fahrenheit. I have also found that if the heater is inadvertently energized during warm or torrid weather that the heat emitted from the resistance wire will not burn or injure the rubber wiper blade or squeegee.

It is apparent that, within the scope of the invention, modifications and different arrangements may be made other than is herein disclosed, and the present disclosure is illustrative merely, the invention comprehending all variations thereof.

What I claim is:

1. A combined windshield wiper and de-icing device including; a metal bar; a movable wiper blade supported by the metal bar; and electrically energizable heating unit; said unit having a core; a resistance wire element mounted upon said core; said element and core being in juxtaposition to and coextensively arranged with respect to the metal bar; a relatively thin layer of hardenable resinous insulating material disposed between said element and said bar; means including a pair of clips for securing the core in fixed relation to said bar, and a current conductor connected to said element for supplying electrical energy thereto.

2. A de-icing device for use with a movable windshield wiper; a metal bar supporting the wiper; a heating element including an elongated core of rigid insulating material; a coil of Nichrome wire surrounding said core; a pair of spaced resilient clips supporting said core on the bar; a relatively thin tubular member of insulating material surrounding the coil; a current conductor connected to one end of said coil for conveying electric energy to said coil from a current supply, one of said clips securing the other end of said coil in engagement with the bar.

3. A de-icing unit for a window cleaning device including; a cleaning blade; a metal bar supporting the blade; a core of insulating material; a coil of resistance wire wound upon said core; said coil and core being co-extensively arranged adjacent the metal bar; said coil being separated from said bar by a layer of an insulating resin; a a pair of metallic clips engageable with said bar and said core for securing the same to said bar; one end of said coil being engaged by one of said clips for establishing a current conducting connection between said coil and said bar, and a current conductor connected to the other end of said coil for conveying electrical energy from a current source to energize said coil.

4. A combined windshield wiper and heating device including; an actuating arm; a wiper carrying bar articulately connected with the actuating arm; an electrically energizable heating unit; means for securing said unit to the wiper carrying bar; a current conducting wire connected to said heating unit for supplying electrical energy from a source of supply thereto; a return circuit for said heating unit including the bar and actuating arm therefor; and a current conducting clip mounted on the bar and in engagement with the actuating arm for establishing an electrical connection from the bar to said arm.

5. A combined windshield wiper and de-icing device including; an actuating arm; a wiper blade supporting bar articulately connected at its mid-portion to the actuating arm; an elongated member; a resistance wire forming a heating element disposed adjacent said elongated member; means for securing the elongated member adjacent to and coextensive with the wiper blade supporting bar; means for connecting one end of said resistance wire to a source of electrical energy; a return circuit for said heating element including the bar and the actuating arm, and a current by-pass element engageable with the bar and actuating arm for establishing electrical connection between the bar and arm.

WILLIAM C. EAVES.

REFERENCES CITED

The following references are of record in the file of this patent:

UNITED STATES PATENTS

| Number | Name | Date |
|---|---|---|
| 1,222,196 | Furber | Apr. 10, 1917 |
| 1,685,389 | Adams | Sept. 25, 1928 |
| 1,686,400 | Trego | Oct. 2, 1928 |
| 1,691,842 | Damush | Nov. 13, 1928 |
| 2,416,572 | De Cordova | Feb. 25, 1947 |
| 2,536,940 | Johnson et al. | Jan. 2, 1951 |